Inventors:
Simon W. Kantor,
Fred F. Holub,
by James W. Underwood
Their Agent.

United States Patent Office 3,036,990
Patented May 29, 1962

3,036,990
WHOLLY AROMATIC POLYESTERS FROM HYDROQUINONE, ISOPHTHALIC AND TEREPHTHALIC ACID REACTANTS
Simon W. Kantor, Schenectady, and Fred F. Holub, Scotia, N.Y., assignors to General Electric Company, a corporation of New York
Filed June 1, 1960, Ser. No. 33,125
10 Claims. (Cl. 260—47)

This invention relates to synthetic polymeric compositions, and more particularly, to a superpolyester formed of p-phenylene isophthalate units interspersed with p-phenylene terephthalate units, including the chlorinated derivatives thereof having one or more chlorine atoms on the aryl nucleus, and still more particularly, to such superpolyesters having an intrinsic viscosity of at least 0.5 and wherein the isophthalate content is at least 60 mole percent of the total of the isophthalate and terephthalate content of the superpolyester.

Although superpolyesters are well known in the art, superpolyesters have had to have an aliphatic component in the polymer chain in order for them to be obtained with the high molecular weight characateristic of the superpolyesters. The ordinary resinous esters of a dicarboxylic acid and a dihydric alcohol are polymers having many monomeric units in the polymer molecule, but they still have relatively low molecular weights as compared to the superpolyesters. Because of the longer polymer molecule associated with the higher molecular weights, the superpolyesters have many useful properties not possessed by the corresponding resinous esters, for example, the impact, flexible and tensile strength properties, are much greater and furthermore, the films and fibers which can be formed from the superpolyesters can be structurally oriented by cold drawing techniques to produce films and fibers which are much more flexible and of higher strength properties in the direction of orientation than the unoriented products.

It has long been known that aromatic ring compounds are much more stable and have much more desirable high temperature properties than the corresponding aliphatic compounds. Unfortunately, the aromatic compounds usually have correspondingly higher melting points therefore, there have been many attempts to prepare polyesters from dihydric phenols and aromatic dicarboxylic acids for use in applications requiring the ability to withstand degradation at elevated temperatures. However, in all attempts the product has been an infusible, insoluble polymer, or a very brittle polymer of no utility, depending on the particular phenol and acid chosen. The closest approach to obtaining a completely aromatic superpolyester has been to react a dihydric phenol with an alkylene oxide to produce a bis(hydroxyalkoxy)aryl compound. For example, in order to make a superpolyester using hydroquinone, the latter is first reacted with, for example, ethylene oxide, to produce 1,4-bis($\beta$-hydroxyethoxy)benzene. These compounds are esterified by reaction with a dibasic acid or a dibasic acid chloride, or by an ester interchange reaction to form its corresponding superpolyester. The alkyl groups in the polymer chain lowered the melting point and increased the solubility sufficiently that either melt or solvent processes could be used for carrying out the reaction. Although such a procedure permitted dihydric phenols and aromatic dicarboxylic acids to be incorporated into superpolyesters, the high temperature stability of the product was sacrificed, due to the introduction of the aliphatic groups into the polymeric chain. Any attempt to react dihydric phenol with a dicarboxylic acid or the ester or acid chloride derivative thereof always resulted in the obtaining of low molecular weight materials which were insoluble and infusible or extremely brittle. The melt process failed because of the fact that even the melting point of the low molecular weight material was so high that thermal decomposition of the polymer always resulted prior to the obtaining of the required high molecular weight material. The ester interchange or the reaction of the acid chloride always failed because of the fact that if carried out in solution the low molecular weight material was precipitated from the solution and was incapable of reacting further to form the high molecular weight material. Attempts to heat the low molecular weight polymer or carry out the reaction without the use of solvents always failed, again because thermal decomposition took precedence over the formation of the high molecular weight polymer.

Our invention may be better understood by reference to the following description, taken in connection with the following drawings, in which.

Figure 1:
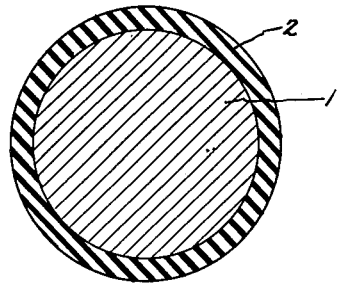
FIG. 1 is a cross-sectional view of an insulated electrical conductor within the scope of the present invention.

We have discovered that superpolyesters formed of p-phenylene isophthalate units interspersed with p-phenylene terephthalate units which can also be described as supercopolyesters of p-phenylene isophthalate and p-phenylene terephthalate, can be made which have intrinsic viscosities of at least 0.5. Surprisingly, the melting point is, at most, only slightly higher than the corresponding lower molecular weight polyesters, but the physical properties are increased tremendously. These superpolyesters contain the structural units (A)
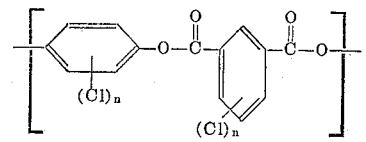

and (B)
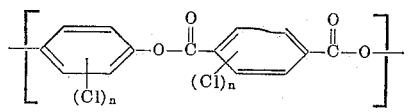

where $n$ is one of the integers 0, 1, 2, in which the units are joined into long molecular chains in a wide variety of fashions. For example, they can be in a random pattern such as: —A—B—A—A—A—B—A—B—B—, a block pattern such as: —A—A—A—A—A—B—B—B—B—A—A—A—A—A—A—, or a regular pattern such as: A—A—A—A—B—A—A—A—A—A—B—A—A—A—B. The ordered pattern such as: —A—B—A—B—A—B—A—B— is possible but commercially impractical of attainment. The pattern of the units and the ratio of A to B units can be controlled by the order of reaction and amount of reactants. The polymer molecule containing both units can be repersented by the formula (C)
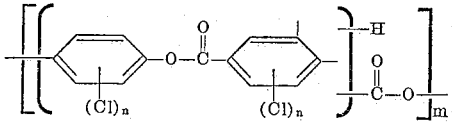

where $n$ is one of the integers 0, 1, 2 and $m$ represents the number of repeating units in the molecular chain. The total number of such units in our superpolyesters is probably at least 50 or higher. However, intrinsic viscosity is a better means of indicating molecular weight due to the uncertainties of determining the actual number of units in the molecule which, at best, is an average value of approximate magnitude.

Intrinsic viscosity is well known in the art and is described in detail in many places in published literature; for example, on page 309 of the book by P. J. Flory, "Principles of Polymer Chemistry," Cornell University Press, Ithaca, New York, 1953. An intrinsic viscosity of at least 0.5, which in the case of our polymers is measured at 75° C. while dissolved in 2,4,6-trichlorophenol, is necessary in order for the polymers to be used for the making of films and fibers having any utility. Polyesters having intrinsic viscosities below this value lack the necessary properties to form useful films and fibers as indicated by their brittleness which increases as the intrinsic viscosity decreases.

The preparation of these superpolyesters is made possible by our discovery that there is a particularly useful group of solvents having the unique property that, although they are not solvents for the polymer at ordinary temperatures, they do become solvents for the completely aromatic polyesters at elevated temperatures, and for the first time permit superpolyesters to be easily prepared from a dihydric phenol and an aromatic dicarboxylic acid when used in the form of the aromatic dicarbonyl halide. Surprisingly enough, not all solvents which are capable of dissolving the resinous polyesters resulting from the reaction are capable of producing the superpolyesters. This unique property appears to be limited to benzophenone, m-terphenyl, chlorinated biphenyls, brominated biphenyls, chlorinated diphenyl oxides, brominated diphenyl oxides, chlorinated naphthalenes and brominated naphthalenes. The reaction of dihydric phenols with aromatic dicarbonyl halides while dissolved in this special class of solvents is more particularly described and claimed in our copending application Serial No. 33,124, filed concurrently herewith and assigned to the same assignee as the present invention.

The above method is particularly applicable for the production of the fusible, thermoplastic linear superpolyesters formed of p-phenylene isophthalate units interspersed with p-phenylene terephthalate units, including the chlorinated derivatives thereof having one or two chlorine atoms on the aryl nucleus, wherein the isophthalate content is at least 60 mole percent of the total of the isophthalate and terephthalate content of said superpolyesers and the intrinsic viscosity of the product is at least 0.5. These superpolyesters are prepared by the reaction in solution of hydroquinone, or a mono-, or dichlorohydroquinone, either with a mixture of an isophthaloyl halide and terephthaloyl halide, or the mono-, or dichloro derivatives thereof, in a 1-step process or by the reaction of the hydroquinone first with an isophthaloyl halide and further reacted with a terephthaloyl halide while dissolved in one of the above-named solvents. Preferably, the isophthaloyl halide and terephthaloyl halide are isophthaloyl chlorides and terephthaloyl chlorides. The solution is heated to a temperature in the range of 270° C. up to the reflux temperature of the solution until the evolution of the hydrogen halide is at least substantially complete. In the 2-stage process of producing our compositions, the terephthaloyl halide is added after substantially all of the isophthaloyl halide has reacted. The heating step to evolve the additional hydrogen halide is continued.

Figure 2:
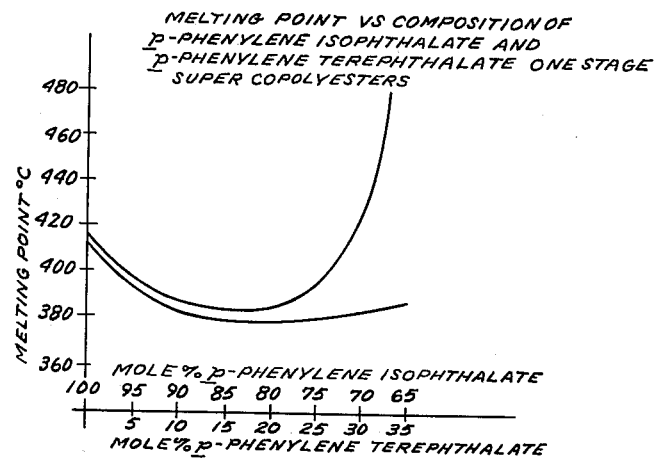
FIG. 2 is a plot showing how the melting point of the various products within the scope of the present invention varies with the different ratios of isophthalate to terephthalate units when made by the 1-stage process.
Figure 3:
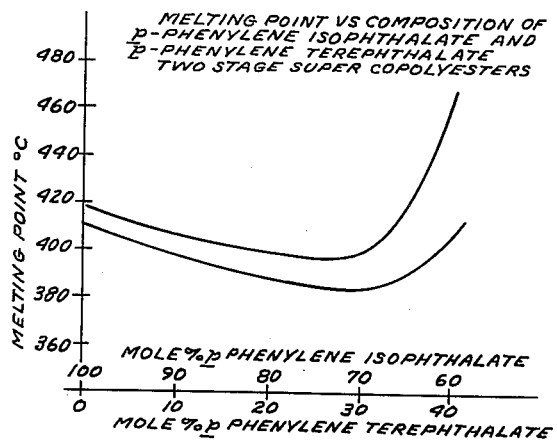
FIG. 3 is the same as FIG. 2 for the same compositions when made by the 2-stage process.

Alternatively, we have found that these super-polyesters may be prepared by another but less suitable method involving the use of the same specific group of solvents. This method involves the ester interchange reaction between a bis(monobasic acid)ester of the hydroquinone and the isophthalic acid and terephthalic acid. In this reaction, the terephthalic and isophthalic acids and the diesters of hydroquinone, e.g., the diacetate, dipropionate, dibenzoate, etc., esters of the hydroquinone, are dissolved in the solvent if a 1-stage process is being used, and heated to a temperature in the range of 240° to 350° C. under reflux conditions which allow distillation of the monobasic acid moiety of the hydroquinone ester, e.g., acetic acid if the ester is p-phenylene diacetate (hydroquinone diacetate). In the 2-stage process, one acid may be added first and reacted, followed by the addition of the second acid. Preferably, the isophthalic acid is reacted first and the terephthalic acid is reacted in the second stage if a 2-stage process is used. In contrast to the 30 to 120 minutes required for the reaction of the acid halide with hydroquinone, the above ester interchange reaction requires an extremely long time, for example, from 6 to 10 hours. The products are dark colored and, because of the extended reaction time at elevated temperature, contain solvent reaction products, especially if the solvent is halogenated. Furthermore, the ester interchange reaction is incapable of removing all of the monobasic acid ester groups and those still remaining in the polymer reduce the high temperature stability of the polymer. The monobasic acid ester groups which are not removed are also a measure of a lower molecular weight, since they occupy terminal groups which are potential chain propagating sites. This method is, however, capable of producing superpolyesters formed of p-phenylene isophthalate units interspersed with p-phenylene terephthalate units having an intrinsic viscosity in the range of 0.5 to 0.7. For best products, we prefer to use the reaction of the hydroquinone with the isophthaloyl chloride and terephthaloyl chloride. Such a reaction is capable of producing transparent, water white, tough, strong products having intrinsic viscosities in the range of 0.5 to 2.0 and above. Either the 1-stage or 2-stage process may be used. However, for those compositions containing the maximum or near maximum amount of terephthalate groups, e.g., 25 to 40 mole percent, we prefer to use the 2-stage process in order to minimize the formation of large blocks of p-phenylene terephthalate units within the polymer molecule which contain no p-phenylene isophthalate units, since the effect of such large blocks is to increase the melting point considerably and decrease the solubility in comparison to a superpolyester of the same composition without such blocks. The effect is graphically illustrated by comparison of the melting points of the compositions in FIGS. 2 and 3, where it is noted that the melting point increases sharply when the p-phenylene terephthalate exceeds 25 mole percent of the polymer units. In the 2-stage process, the increase is not as sharp and occurs after the p-phenylene terephthalate content exceeds 30 mole percent, and useful products may be obtained by the 2-stage process with the p-phenylene terephthalate content as great as 40 mole percent of the total units. In carrying out the 2-stage process, all of the hydroquinone is reacted first with isophthaloyl halide, while dissolved in the solvent, at the reaction temperature until at least substantially all of the hydrogen halide is evolved and then the terephthaloyl halide is added and the reaction continued to completion. Such a process minimizes the formation of large units of p-phenylene terephthalate units in the polymer molecule.

In our copending application Serial No. 33,131, filed concurrently herewith and assigned to the same assignee as the present invention, we have disclosed and claimed superpolyesters of p-phenylene isophthalate and mono- and dichloro-substituted isophthalates and supercopolyesters of these materials. Although p-phenylene terephthalate has a very high melting point, we have discovered that if a superpolyester is made having both p-phenylene isophthalate and p-phenylene terephthalate units in the polymer molecule, i.e., a supercopolyester of these two materials, that the product has a lower melting point range than the p-phenylene isophthalate which is the lower melting of the two separate materials. This lowering of the melting point range is illustrated graphically in FIGS. 2 and 3. In determining the points from which these curves were drawn, a standard melting point apparatus using a heated metal block was used. The lower curve represents where the edges of the mass of powdered resin became clear and the top curve represents where the entire mass of resin became clear without application of pressure. The area between the two curves represents the temperatures which can be used to shape our compositions under heat and pressure, e.g., by molding, extrusion, etc., into useful articles. Normally, we prefer to use temperatures at, near, or slightly higher than the top curve.

In the range of 0.1 to 5 mole percent of p-phenylene terephthalate units, the 1-stage method of preparation gives the greatest reduction of melting range. However, as previously mentioned, the 2-stage process extends the lowering of the melting point range to higher concentrations of p-phenylene terephthalate. This suprising effect extends from practically 0 mole percent, e.g., 0.1 mole percent up to 40 mole percent of p-phenylene terephthalate units in the superpolyester. Our preferred range is from 5 to 30 mole percent p-phenylene terephthalate units in the superpolyester.

Other related superpolyesters are disclosed and claimed in our copending applications, filed concurrently herewith and assigned to the same assignee as the present invention.

(1) Linear superpolyesters formed of p-phenylene isophthalate units interspersed with p,p'-biphenylene isophthalate units, the intrinsic viscosity of the superpolyester being at least 0.5 and the p-phenylene isophthalate units being at least 40 mole percent of the total p-phenylene isophthalate and p,p'-biphenylene isophthalate units in the superpolyester, disclosed and claimed in our copending application Serial No. 33,126.

(2) Chlorine-containing, p-phenylene isophthalate, linear superpolyesters having an intrinsic viscosity of at least 0.5 wherein at least 15 mole percent of the isophthalate radicals have from one to two chlorine substituents on the aryl nucleus and the p-phenylene radicals are selected from the group consisting of p-phenylene, monochloro-p-phenylene and dichloro-p-phenylene groups, disclosed and claimed in our copending application Serial No. 33,127.

(3) Linear, superpolyesters having an intrinsic viscosity of at least 0.5 and formed of the four structural units (1) p-phenylene units, (2) units selected from the group consisting of o-phenylene units, m-phenylene units and o,o'-biphenylene units (3) isophthalate units and (4) terephthalate units, the sum of (1), (2), (3) and (4) equalling 100% of the total units of the polymer, the units of (1) being from 25 to 45% of the total units, the units of (2) being from 5 to 25% of the total units, the units of (3) being from 20 to 45% of the total units, the units of (4) being from 5 to 30% of the total units, the units of (1) and (2) forming esters with the units of (3) and (4), the sum of (1) and (2) being from 1 to 1.05 times the sum of (3) and (4) and the sum of (1) and (4) being no greater than 0.7 times the total sum of units, disclosed and claimed in our copending application Serial No. 33,128.

(4) Linear, superpolyesters formed of m-phenylene terephthalate units interspersed with from 0 to 30 mole percent of p-phenylene terephthalate units, based on the total m-phenylene terepthalate and p-phenylene terephthalate units, the intrinsic viscosity of said superpolyester being at least 0.5, disclosed and claimed in our copending application Serial No. 33,130.

In order that those skilled in the art may understand our invention, the following examples are given by way of illustration and not by way of limitation.

EXAMPLE 1

This example illustrates the one-stage method of making our copolymers.

A mixture of 5.50 grams (0.050 mole) of hydroquinone, 9.13 grams (0.045 mole) of isophthaloyl chloride, 1.02 grams (0.005 mole) of terephthaloyl chloride, and 88 grams of mixed pentachlorodiphenyl ethers was placed in a reaction flask. This mixture was stirred while gradually increasing the temperature. After 2 minutes of heating the temperature was 155° C. A homogeneous solution was obtained at 145° C. After 8 minutes of heating, the temperature was 335° C. and most of the hydrogen chloride evolution had subsided. The reaction mixture was heated for another 15 minutes at a temperature of 332°–335° C. to give a viscous solution. The clear solution was then allowed to cool, whereupon the polymer precipitated as a white solid at 290 C. When cooled to room temperature the polymer mixture was stirred in a blendor with about 300 ml. acetone. The suspension was then poured into a beaker and 400 ml. more acetone was added. The mixture was boiled and the liquid decanted. The polymer was washed 3 times more with 750 ml. portions of boiling acetone, filtered and dried by suction for 1 hour. There was obtained 11.40 grams (95.2% yield) of white polymeric poly-p-phenylene isophthalate terephthalate. This polymer had a melting point of 388°–392° C. and an intrinsic viscosity of 0.84 in a 50/50 mixture of 2,4,6-trichlorophenol/orthochlorophenol solvent at 117° C. A sample of the polymer was pressed between aluminum foil at 400° C. and 2000 lbs./square inch pressure. The resulting hot film was quenched in water to yield a clear, tough, flexible film.

Table I shows a summary of properties of polymers made duplicating the method described above except for varying the mole ratio of isophthaloyl chloride to terephthaloyl chloride as indicated in the first column of the table.

*Table I*

| Mole Ratio of R(COCl)$_2$[a] | Intrinsic Viscosity of Polymer [η] | M.P., ° C. | Yield, percent | Precipitation Temp., ° C. |
|---|---|---|---|---|
| I/T | | | | |
| 95/5 | 1.29[b] | 388–395.5 | 96.5 | 291 |
| 90/10 | 0.84[c] | 388–392 | 95.2 | 290 |
| 85/15 | 0.93[c] | 380.5–384 | 94.5 | 285 |
| 80/20 | 0.88[c] | 379–386 | 95.0 | 265 |
| 75/25 | 1.02[c] | 385–388 | 95.6 | 288 |
| 70/30 | (d) | 383–437 | 94.2 | 285 |
| 65/35 | (d) | 388–>500 | 96.5 | 290 |

[a] I=isophthaloyl; T=terephthaloyl.
[b] Determined in trichloroacetic acid at 75° C.
[c] Determined in a mixture of 50/50 2,4,6-trichlorophenol-o-chlorophenol at 117° C.
[d] Insoluble in the mixture of chlorinated phenols or trichloroacetic acid.

The copolymers listed in Table I were pressed into films at temperatures of 400°–425° C. and 2000 lbs./square inch pressure, followed by quenching in water. In this manner, amorphous, transparent films were obtained from the first 5 polymers in Table I. The last 2 polymers were obtained as hazy films which were crystalline as indicated by their X-ray diffraction pattern. The transparent, amorphous polymers exhibited typical X-ray amorphous diffraction patterns with no sharp rings.

The tensile strengths and elongations at room temperature and 30° C. of the copolymer films are listed in Table II. The high tensile strengths at 250° C. are indicative of the excellent physical properties at elevated temperatures.

*Table II*

| Copolymer | | Room Temperature Properties | | Properties at 250° C. | |
|---|---|---|---|---|---|
| I | T | Tensile, p.s.i. | Elongation, percent | Tensile, p.s.i. | Elongation, percent |
| 95 | 5 | 9,290 | 46 | 4,155 | 191 |
| 90 | 10 | 9,810 | 53 | 7,330 | 263 |
| 85 | 15 | 10,560 | 60 | 6,950 | 289 |
| 80 | 20 | 9,560 | 53 | 6,140 | 280 |
| 75 | 25 | 9,780 | 59 | 4,493 | 300 |
| 70 | 30 | 7,865 | 30 | 3,348 | 254 |
| 65 | 35 | 8,895 | 40 | 1,660 | 130 |

Amorphous transparent films and tapes can also be prepared by extrusion from the melt followed by quenching. By heating the amorphous films at temperatures greater than 200° C., the polymers crystallize, resulting in an increase in density (decrease in volume), an increase in stiffness and modulus, and a decrease in elongation at elevated temperatures. In addition, such crystallized films remain transparent. For example, the quenched, amorphous 85I/15T copolymer film has a density of 1.343±0.003 grams/cc. at 25° C. and exhibits an initial modulus of 106,000 p.s.i. By heating the film for 1 hour at 300° C., the density increased to 1.394 grams/cc. at 25° C. and the modulus increased to 141,000 p.s.i. This crystallized film has a tensile strength of 11,600 p.s.i. and an elongation of 28%.

Crystalline films of the copolymer of poly-p-phenylene isophthalate terephthalate may also be prepared by pressing the polymers at 400°–425° C. under pressure and allowing the hot films to cool slowly to room temperature instead of quenching in cold water. These slow-cooled films are translucent to opaque, depending on the rate of cooling, and exhibit a crystalline X-ray diffraction pattern. These crystalline films are more rigid than the amorphous films prepared by quenching. The films which are cooled the slowest will be the most opaque, brittle, and dense, and will embrittle rapidly when heated above 200° C.

Fibers of the copolymers of poly-p-phenylene isophthalate terephthalate have been prepared by drawing fibers from the melt or by extruding the melt through a die to form monofilaments. For example, a quenched extruded fiber of a copolyester having an isophthalate-terephthalate ratio of 85I/15T has a density of 1.342 grams/cc. at room temperature. The fiber may be heat set by heating above 200° C.; thus by heating it 1 minute at 300° C., the density increased to 1.370 and formed a stronger crystalline fiber. The amorphous fibers were oriented by drawing 200% at 275° C. and crystallizing by heating for short periods at 300°–350° C. to obtain the desired percentage of crystallization. In this manner, crystallized, tough fibers with densities greater than 1.410 grams/cc. were readily obtained.

EXAMPLE 2

This example illustrates the two-stage method of making poly-p-phenylene isophthalate-terephthalate copolymers.

A mixture of 11.12 grams of hydroquinone (0.101 mole), 17.25 grams of isophthaloyl chloride (0.085 mole), and 216 grams of mixed trichlorobiphenyls was placed in a reaction flask which was flushed with dry nitrogen gas. This mixture was stirred while gradually increasing the temperature. The following observations were noted:

Table III

| Elapsed Heating Time, minutes | Temperature, ° C. | Remarks |
| --- | --- | --- |
| 0 | 32 | heterogeneous mixture. |
| 5 | 160 | homogeneous yellow solution; HCl evolution observed. |
| 25 | 230 | solution clouding up. |
| 39 | 315 | polymer in solution—clear. |
| 50 | 320 | clear solution allowed to cool to room temperature. |
|  | 40 | added 3.05 grams of terephthaloyl chloride (0.015 mole); heating started; mixture heterogeneous. |
| 59 | 250 | very fluid heterogeneous solution. |
| 74 | 325 | clear homogeneous solution. |
| 90 | 323 | viscous solution. |
| 120 | 320 | very viscous solution. |
| 127 | 318 | end heating. |

The solution was allowed to cool, whereupon the polymer precipitated as a white solid at 270° C. When cooled to room temperature one liter of acetone was added and the mixture was stirred, heated to boiling, cooled, allowed to settle and the liquid was decanted. The polymer was washed 3 times with 1-liter portions of boiling acetone, filtered, and dried. There was obtained 23.82 (99.3% yield) of a white powder. This polymer had a melting point of 393°–400° C. and an intrinsic viscosity of 0.95 in 2,4,6-trichlorophenol solvent at 75° C. A sample was pressed between aluminum foil at 405° C. and 2000 lbs./square inch pressure, followed by quenching in water to give a transparent, tough, clear, flexible film.

Table IV shows a summary of properties of polymers made by the method described above, except for varying the mole ratio of isophthaloyl chloride to terephthaloyl chloride as indicated in the first column of the table. All of these polymers formed tough, flexible films and fibers.

Table IV

| Mole Ratio of R(COCl)$_2$[a] | Intrinsic Viscosity of Polymer [η][b] | M.P., ° C. | Yield, percent | Precipitation Temp., ° C. |
| --- | --- | --- | --- | --- |
| I/T |  |  |  |  |
| 90/10 | 0.90 | 397–405 | 95.8 | 285 |
| 85/15 | 0.95 | 393–400 | 99.3 | 270 |
| 80/20 | 0.91 | 389–397 | 98.0 | 250 |
| 75/25 | 0.94 | 384–401 | 97.5 | 245 |
| 70/30 | 0.83 | 382–391 | 96.8 | 265 |
| 65/35 | 1.02 | 394–437 | 97.2 | 273 |
| 60/40 | 1.24 | 414–471 | 96.7 | 275 |

[a] I = isophthaloyl; T = terephthaloyl.
[b] Determined in 2,4,6-trichlorophenol at 75° C.

EXAMPLE 3

This example illustrates the preparation of a 2-stage copolymer using phenol as a chain-stopper.

A mixture of 11.01 grams of hydroquinone (0.100 mole), 16.24 grams of isophthaloyl chloride (0.080 mole), 0.28 gram of phenol (0.003 mole), and 219 grams of mixed trichlorobiphenyls was placed in a reaction flask. The mixture was stirred and heated. After 7 minutes, a homogeneous yellow solution was obtained at 300° C. Most of the HCl evolution had subsided at this time. After a total of 12 minutes of heating, the reaction temperature was 322° C.; the solution was allowed to cool to 110° C., and 4.06 grams (0.020 mole) of terephthaloyl chloride was added. Heating was resumed and at the end of 7 minutes of heating, the solution had become a fluid and the temperature was 319° C. The reaction was allowed to proceed for an additional 30 minutes at a temperature of 308°–322° C. At the end of this time, the moderately viscous solution was allowed to cool and the polymer precipitated at 253° C. to yield a heterogeneous fluid mixture. When this mixture had cooled to room temperature, the polymer was washed 4 times with 1-liter portions of hot acetone, filtered, dried by suction, and finally dried overnight in air. There was obtained 23.39 grams (96.3%) of white polymer. A sample of this polymer had an intrinsic viscosity of 0.74 in 2,4,6-trichlorophenol at 75° C. A sample of the powder was pressed between aluminum foil at a temperature of 410° C. under a pressure of 2000 lbs./square inch. The resulting quenched film was flexible, tough and colorless.

EXAMPLE 4

This example illustrates the preparation of a polyphenylene isophthalate terephthalate copolymer using a monoester of diacid chloride as a chain stopper. The preparation of the chain-stopper was carried out as follows:

A mixture of 9.41 grams of phenol (0.10 mole), and 20.30 grams of isophthaloyl chloride (0.10 mole), was placed in a reaction flask and heated gradually. The HCl evolution started at 105° C. After 6 minutes, the temperature was 150° C. and a clear yellow solution was obtained. After 11 minutes' heating, the temperature was 245° C. and the reaction subsided. The mixture was heated for an additional 7 minutes from 245° to 300° C. This mixture was cooled to room temperature and kept under nitrogen. It is essentially monophenyl isophthaloyl chloride and is designated as St-1.

A mixture of 11.26 grams of hydroquinone (0.1025 mole), 17.26 grams of isophthaloyl chloride (0.085 mole), 0.78 gram of St-1, and 190 grams of mixed trichlorobiphenyls was placed in a reaction flask. This mixture was stirred while gradually increasing the temperature. After 10 minutes of heating, the temperature was 300° C. and a homogeneous solution was obtained. After a total of 18 minutes of heating, the temperature was 308° C. and 3.04 grams (0.015 mole) of terephthaloyl chloride dissolved in 26 grams of mixed trichlorobiphenyls was added. The addition tube was washed with an additional 10 grams of trichlorobiphenyls. The clear reaction mixture was heated for an additional 2 hours at 315°–328° C., yielding a viscous solution which was then allowed to cool under nitrogen. The polymer precipitated as a solid at 248° C., and when cooled to room temperature, the polymer was stirred and washed 4 times with 1 liter of boiling acetone, filtered and dried. There was obtained 24.08 grams of a white powder. This polymer had an intrinsic viscosity of 1.11 in 2,4,6-trichlorophenol at 75° C. A sample was pressed between aluminum foil at 410° C. and 2000 lbs./square inch pressure, followed by quenching to give a clear, colorless, transparent, flexible film.

EXAMPLE 5

This example illustrates the preparation of a phenylene isophthalate terephthalate copolymer using a monobenzoate of a diphenol as a chain stopper. The chain stopper was synthesized as follows.

A mixture of 11.01 grams of hydroquinone (0.10 mole), and 14.06 grams of benzoyl chloride (0.10 mole), was heated in a flask under nitrogen. After 2 minutes heating, the temperature was 105° C. and vigorous HCl evolution occurred. After 3½ minutes, the temperature was 108° C. and the mixture solidified. After continued heating for a total of 7 minutes, the temperature reached 162° C. and the solid remelted to a yellow solution. Heating was continued for an additional 7 minutes from 162° to 309° C. The mixture was allowed to cool to room temperature where it solidified. This product is essentially p-hydroxyphenyl benzoate and is designated as St-2.

A mixture of 11.01 grams of hydroquinone (0.100 mole), 17.26 grams of isophthaloyl chloride (0.085 mole), 0.64 gram of St-2, and 180 grams of mixed trichlorobiphenyls was placed in a reaction flask. This mixture was stirred while gradually increasing the temperature. After heating the mixture for 5 minutes, a clear, fluid, yellow solution was obtained and the temperature was 300° C. After heating 10 minutes, the temperature was 317° C. and 3.04 grams of terephthaloyl chloride (0.015 mole) dissolved in 32 grams of mixed trichlorobiphenyls was added gradually; an additional 10 grams of solvent was used to rinse the addition tube. The addition took 9 minutes after which the mixture was heated for an additional 119 minutes at 320°–338° C., to give a viscous solution. The reaction was allowed to cool under nitrogen, whereupon the polymer precipitated as a solid at 260° C. When cooled to room temperature, the polymer was washed 4 times with 1-liter portions of boiling acetone, filtered and dried. There was obtained 23.72 grams of a white powder. This polymer had an intrinsic viscosity of 0.765 in 2,4,6-trichlorophenol at 75° C. A sample was pressed between aluminum foil at 415° C. and 2000 lbs./square inch pressure, followed by quenching in ice water to give a colorless, flexible film.

EXAMPLE 6

This example illustrates the preparation of a poly-p-phenylene isophthalate terephthalate copolymer using excess hydroquinone as a chain stopper.

All the reagents used in this experiment were redistilled. The weighings were made in a nitrogen-filled dry box.

A mixture of 11.40 grams (0.1035 mole) of hydroquinone, 15.23 grams (0.0750 mole) of isophthaloyl chloride and 220 grams of mixed trichlorobiphenyls were placed in a 1-liter open reaction flask. The mixture was stirred and heated, and after 5 minutes, a homogeneous yellow solution was obtained at 300° C. Most of the HCl evolution had subsided at this time. After a total of 10 minutes of heating, the reaction temperature was 310° C., at which time a solution of 5.07 grams (0.0250 mole) of terephthaloyl chloride in 40 grams of mixed trichlorobiphenyls was slowly added from a dropping funnel. The addition took four minutes after which another 20 grams of mixed trichlorobiphenyl was added to wash the residual acid chloride solution from the funnel into the reaction mixture. At the end of 36 minutes of total reaction, the solution had become viscous and the temperature was 310° C. The reaction was allowed to proceed for an additional 100 minutes at a temperature of 310° C. At the end of this time, the solution was allowed to cool and the polymer precipitated at 250° C. to yield a pasty mixture. When this mixture had cooled to room temperature, it was diluted with 1 liter of acetone and the polymer was vigorously stirred in a blender, washed 4 times with 1-liter portions of hot acetone, filtered, dried by suction and finally dried overnight in air. There was obtained 23.8 grams (98.1%) of white polymer. A sample of this polymer had an intrinsic viscosity of 1.14 in 2,4,6-trichlorophenol at 75° C. On analysis, this polymer was found to have a total chlorine content of 0.020% chlorine. A 1-gram sample of this polymer was pressed between aluminum foil at a temperature of 415° C. under a pressure of 2000 lbs./square inch. The resulting quenched film was a colorless, tough, flexible film.

Similarly, a 2-stage poly-p-phenylene isophthalate terephthalate copolymer was made using a ratio of 85 moles of isophthaloyl chloride to 15 moles of terephthaloyl chloride and a 3.25 mole percent excess over stoichiometric of hydroquinone. The resulting polymer had an intrinsic viscosity of 0.96 measured in 2,4,6-trichlorophenol at 75° C. This polymer was analyzed for carbon and hydrogen which agreed with the structure $(C_{14}H_8O_4)_x$. Calculated for $(C_{14}H_8O_4)_x$: C, 70.0, H, 3.33. Found: C, 69.5; H, 3.60.

EXAMPLE 7

This example illustrates that our polymers may be made by an ester exchange reaction if our solvents are used. A mixture of 19.81 grams (0.102 mole) of p-phenylene diacetate, 14.12 grams (0.085 mole) of isophthalic acid, 2.49 grams (0.015 mole) of terephthalic acid, and 220.0 grams mixed trichlorobiphenyls was placed in a reaction flask fitted with a stirrer, thermometer, condenser and Dean-Stark trap. This mixture was stirred while gradually increasing the temperature. The following observations were noted:

| Elapsed Heating Time, Minutes | Reaction Temperature, ° C. | Remarks |
| --- | --- | --- |
| 0 | 25 | heterogeneous mixture. |
| 14 | 276 | acetic acid formation detected. |
| 15 | 295 | .1 ml. of acetic acid collected. |
| 31 | 343 | 10.1 ml. of acetic acid collected; homogeneous brown solution. |
| 63 | 347 | 11.3 ml. of acetic acid collected; dark solution, solvent refluxing. |
| 374 | 349 | end heating; 11.9 ml. of acetic acid collected corresponding to 99.3% yield. |

After 374 minutes, the solution was allowed to cool, whereupon the polymer precipitated from solution. When cooled to room temperature, the polymer was washed 4 times with 1-liter portions of boiling acetone, filtered and air-dried. There was obtained 24.40 grams (99.7% yield) of a whitish-tan powder having an intrinsic viscosity of 0.635 in 2,4,6-trichlorophenol at 75° C. A sample of powder was pressed between aluminum foil at 415° C. and 2000 lbs./square inch pressure, followed by quenching in water to give a brown, transparent, tough and flexible film.

EXAMPLE 8

A mixture of 14.5 grams of monochlorohydroquinone, 5.10 grams of terephthaloyl chloride, 15.10 grams of isophthaloyl chloride, and 125.0 grams of mixed trichlorobiphenyls was placed in a reaction flask which was flushed with dry nitrogen gas. This mixture was stirred while gradually increasing the temperature. After 3 minutes, the temperature of the homogeneous solution was 190° C. and the evolution of HCl had started. After 8 minutes, the temperature had reached 320° C. and the HCl evolution had slowed down considerably. The resulting solution was stirred and refluxed for an additional 6 minutes at a temperature of 320°–332° C., to yield a viscous, yellow solution. The solution was allowed to cool, thereby precipitating the polymer at a temperature of 165° C. When the mixture had cooled to room temperature, the polymer was separated from the reaction mixture and slurried 4 times with 1-liter portions of hot acetone, filtered, and allowed to dry by suction. There was obtained 24.1 grams of white polychloro-p-phenylene isophthalate terephthalate, melting at 289°–306° C. A sample of this polymer was pressed between aluminum foil at 400° C. under a pressure of 1500 lbs./square inch. The pressed film was air-cooled to room temperature to give a transparent, flexible, tough film. The chlorine substituent in the hydroquinone minimizes the crystallization of the polymer so that quenching becomes unnecessary.

EXAMPLE 9

This example illustrates the preparation of a poly-p-phenylene isophthalate-terephthalate copolymer containing chlorine atoms in the terephthalate segments.

A mixture of 2.76 grams of 2,5-dichloroterephthaloyl chloride (0.010 mole), 8.12 grams of isophthaloyl chloride (0.040 mole), 5.70 grams of hydroquinone (0.052 mole) and 100.0 grams mixed trichlorobiphenyls was placed in a reaction flask which was flushed with dry nitrogen gas. This mixture was stirred while gradually increasing the temperature. After 3 minutes of heating, the reaction temperature was 190° C., and the clear solution was rapidly evolving HCl. After 9 minutes of heating, the temperature was 330° C. and the evolution of HCl had subsided. The mixture was heated for an additional 21 minutes at 330°–332° C. yielding a clear, viscous solution. The solution was allowed to cool, whereupon the polymer precipitated as a white solid at 250° C. When cooled to room temperature, the polymer was washed 3 times with 1 liter of acetone, filtered and dried. There was obtained 13.0 grams of a white copolymer of p-phenylene isophthalate and p-phenylene 2,5-dichloroterephthalate melting at 363°–371° C. This polymer had an intrinsic viscosity $[\eta]=0.52$ in 2,4,6-trichlorophenol solvent at 75° C. A sample was pressed at 415° C. and 2000 lbs./square inch pressure, followed by quenching in water to give a clear, flexible film. Another sample was pressed at 415° C. and 2000 lbs./square inch pressure and allowed to gradually cool in air; this unquenched film crystallized to give a hazy, flexible, tough film.

EXAMPLE 10

This example illustrates the 2-stage preparation of a poly-p-phenylene isophthalate-terephthalate copolymer containing chlorine in the isophthalate segments.

A mixture of 11.2 grams of hydroquinone (0.102 mole), 11.9 grams of 5-chloroisophthaloyl chloride (0.0502 mole), and 143.0 grams of mixed trichlorobiphenyls was stirred and heated. The temperature was gradually increased from 24° C. to 330° C. over a period of 11 minutes, after which time most of the HCl evolution had subsided. The mixture was cooled to 190° C. and there were added 10.0 grams (0.0493 mole) of terephthaloyl chloride. The reaction was reheated gradually to 330° C. and the polymerization was allowed to proceed for 3 minutes at 305°–330° C. to form a viscous solution. When allowed to cool, the polymer precipitated at 245° C. to form a pasty mixture. The polymer was isolated by stirring with 1 liter of acetone and filtering. The polymer was washed 3 times with 1-liter portions of hot acetone, filtered and dried to give 15.0 grams of white poly-p-phenylene-5-chloroisophthalate-terephthalate copolymer. This polymer melted at 315°–332° C. and had an intrinsic viscosity of 0.87 in 2,4,6-trichlorophenol at 75° C. Tough, flexible, transparent films were made by molding the polymer at 425°–440° C. and 1500–2000 lbs./square inch pressure, followed by quenching in water. This example indicates that when the isophthalate units contain a chlorine atom, useful polymers having up to 50 mole percent terephthalate groups may be prepared.

EXAMPLE 11

This example illustrates the preparation of a poly-p-phenylene isophthalate-terephthalate copolymer containing at least one chlorine atom in every aromatic ring.

A mixture of 3.68 grams (0.0255 mole) of monochlorohydroquinone, 0.68 gram (0.0025 mole) of 2,5-dichloroterephthaloyl chloride, 5.35 grams (0.0225 mole) of 5-chloroisophthaloyl chloride, and 71 grams of redistilled mixed trichlorobiphenyls was stirred and heated. At 155° C., a vigorous evolution of HCl started. The reaction mixture was heated for 6 minutes to reach 300° C. and was kept at 300°–310° C. for an additional 30 minutes. The resulting viscous light yellow solution was allowed to cool, whereby the polymer precipitated at 90° C. The mixture was pulverized with 500 ml. of acetone in a blendor and filtered. The polymer was washed 4 times with 1-liter portions of hot acetone, filtered and dried to give 7.80 grams of polymer. This copolymer of chloro-p-phenylene 5-chloroisophthalate-2,5-dichloroterephthalate, melted at 240°–262° C., and had an intrinsic viscosity of 0.54 in 2,4,6-trichlorophenol at 75° C. A sample which was pressed at 390° C. under 2000 lbs./square inch pressure and quenched in water gave a tough, flexible, transparent film.

The above polymers which contain chlorine are particularly resistant to combustion.

EXAMPLE 12

This example illustrates several methods which may be employed to prepare a wire or conductor insulated with the compositions disclosed in this application. As representative of the compositions, a copolymer of poly-p-phenylene isophthalate terephthalate containing 85 mole percent of isophthalate units and 15 mole percent of terephthalate units was used to prepare the insulated conductor.

Direct extrusion of the polymer through a die onto nickel coated copper wire was accomplished readily at temperatures of 390°–425° C. with a copolymer having intrinsic viscosities of 0.6 to 1.10. The hot extruded insulated wire was quenched in water to yield an amorphous, continuous insulation on the wire. By subsequently heating the insulated wire at 300° C. for 1 hour, the amorphous polymer crystallized to give a tough, crystalline, continuous coating on the wire.

Another method which was used to prepare an insulated conductor involved the preparation of a continuous tape of the amorphous polymer by extrusion through a die and quenching. This tape was then used to wrap an aluminum conductor by overlapping the tape edges by at least ¼ of the tape width. When such a wrapped conductor was heated for 2 hours at 300° C., the tape crystallized and shrank tightly around the conductor. This gave a tough, flexible, continuous insulated conductor.

A third method which was used to prepare an insulated conductor was to apply the copolymer of poly-p-phenylene isophthalate terephathlate from solution onto a conductor. For example, a solution was prepared by dissolving 144 grams of polymer in 1656 grams of 2,4,6-trichlorophenol at 160° C. under $N_2$ to give an 8% solution. This solution was applied to 0.0508 nickel plated copper wire at 465° C. In order to obtain a 2 mil build on the wire, 8 dips were applied and heated. The resulting wire was insulated with a tough, flexible coating of copolymer.

As several of the examples have illustrated, if it is desired to modify the molecular weight of our linear polyesters, chain stopping agents such as one or more monohydric phenols or one or more monobasic acid chloride may be added in minor amounts, e.g., 0.1 to 1% of the corresponding difunctional compound may be added along with the other ingredients, during the condensation reaction, or after the main condensation reaction is completed. Examples of monohydric phenols which may be added are phenol itself, the cresols, e.g., ortho-, meta- and paracresol, the xylenols, e.g., 2,3-xylenol, 2,4-xylenol, 2,5-xylenol, 2,6-xylenol, 3,5-xylenol, etc., the hydrocarbons and hydrocarbonoxy-substituted phenols, e.g., ethylphenol, propylphenol, isopropylphenol, butylphenol, tertiary butylphenol, amylphenol, the phenylphenols, naphthylphenols, the phenoxyphenols, the methoxyphenols, ethoxyphenols, phenoxyphenols, etc., including all of those phenols in which one or more of the hydrogen atoms attached to the aryl nucleus are replaced by a halogen atom such as fluorine, chlorine, bromine, or iodine, e.g., the mono-, di-, tri-, tetra- and pentachlorophenols, the mono-, di-, tri-, tetra- and pentabromophenols, the mono-, di, tri-, tetra- and pentaiodophenols, the mono-, di-, tri-, tetra- and pentafluorophenols, the mono-, di-, tri-, tetrachlorocresols, and the mono-, di-, tri-, chloroxylenols, etc. The monohydric phenol may also be a di- or trihydric phenol in which all but one hydroxyl group has been esterified with an acid, e.g., p-hydroxyphenylbenzoate, p-hydroxyphenyltoluate, m-hydroxyphenylbenzoate, o-hydroxyphenylbenzoate, 5-hydroxyphenylene-1,3 dibenzoate, etc.

In those cases where free hydroxyl groups are desired in the polymer chain, a dihydric phenol, e.g., hydroquinone, resorcinol, etc., may be used as the chain stopping agent.

Monobasic acid halides which may be used are the acid halides of the aromatic series such as benzoyl chloride, benzoyl bromide, benzoyl iodide, toluoyl chloride, naphthoyl chloride, biphenylcarbonyl chloride, etc., including halogenated derivatives thereof. Although monobasic acid halides of the aliphatic series may be used, we prefer not to use them since they destroy the high temperature stability of the polymers. For the same reason, we prefer that the esters of the di- and trihydric phenols be aromatic monocarboxylic acid esters and that, if substituted, the substituent grouping be chlorine.

The dichlorohydroquinones useful in making our superpolyesters may be any of various isomers or mixtures thereof, for example, the 2,3-, 2,5- or 2,6-dichlorohydroquinones. There is only one monochlorohydroquinone. It is sometimes referred to as chlorohydroquinone. Because the exact position of the chlorine atoms does not affect the desirable properties of our superpolyesters, we have found that the commercially available dichlorohydroquinone which is essentially a mixture of the 2,3- and 2,5-dichloro isomers in which the latter predominates, is completely satisfactory as a reactant, but may be resublimed if a lighter color is desired in the product. Likewise, the chlorine atoms on the isophthalate and terephthalate units may be any of the various mono- and dichloro isomeric derivatives.

In making the copolymers of our invention the proportions of any one of the non-halogenated units of the polymer, e.g., p-phenylene terephthalate or isophthalate units, to its corresponding mono- or dichloro derivative may vary from 100% of any one up to mixtures of two or more in any proportions, keeping in mind the previously discussed ratio of terephthalate to isophthalate units.

The superpolyesters of this invention are suitable for a wide variety of uses. As coating compositions they may be coated onto metallic or nonmetallic substrates by flame spraying, melt casting, or by casting while dissolved in one of the solvents in which it is made, and thereafter evaporating the solvent at an elevated temperature and at reduced pressure. The hot solution of the solvent may be forced through a spinneret into a heated drying tower, preferably maintained at reduced pressure to form filaments and fibers, or the molten polymer may be forced through spinnerets by well known techniques to form filaments and fibers. In both cases the formed filament may be cold drawn to structurally orient the polymer in the direction of the fiber axis to increase the tensile strength. The fibers so formed may be formed into yarns or used to form fiber matting. Alternatively, the superpolyesters may be cast from solution or from the melt of the polymer, extruded through a die, or otherwise sheeted to form a continuous film of the superpolyester. These films may be oriented by cold drawing in either one or both of their major dimensions, to orient the polymer molecules in the plane of the film. For best properties, it is well to form a balanced film by orienting in both directions. It is to be understood that the cold drawing of either the film or fiber involves any stretching and/or rolling of the film below the melting point of the polymer. Preferably, the cold drawing is done above the second order transition temperature of the polymer. The amount of stretching and/or rolling is usually sufficient to increase the dimensions to at least twice the original length in the case of fibers, and to twice the surface area of the plane in the case of a film. The oriented film is heat-set between 200°–350° C. but preferably 275°–350° C. while maintained under tension. As the examples have illustrated, the crystalline, non-chlorine-containing products formed by heat and pressure and allowed to cool slowly are rigid and translucent or opaque. If, instead of allowing an object to cool slowly, it is cooled rapidly, for example by quenching in cold water or in a blast of cold air, the material is transparent and amorphous. If this amorphous material is heated above its second order transition point, but below its softening point, e.g., to a temperature in the range of 200°–350° C., but preferably 275°–350° C., the amorphous state is unstable and the film crystallizes. However, in contrast to the crystalline state obtained by slow cooling of the film from the molding temperature, the film remains clear and flexible. The effect of this crystallization is to cause the density of the polymer to increase and for the actual physical dimensions to decrease. This same effect would be noticed if the polymer was extruded in the form of tubing and quenched. This shrinkage can be utilized to advantage, for example, in the preparation of an insulated electrical conductor shown in FIG. 1. In the case of the film, electrical conductor 1 is wound with the film in the form of a tape in a spiral fashion with either the adjacent edges abutting each other or overlapping to produce insulating layer 2. In the case of tubing, the tubing is slipped onto electrical conductor 1 to provide insulation layer 2. In both cases, the film or tubing is shrunk tightly onto electrical conductor 1 by heating insulation layer 2 to a temperature in the range of 200°–350° C., but preferably 275°–350° C.

Other uses for our films and the fabrics or mats made from the fibers include a wide variety of electrical applications, that is, as a dielectric, for example, as a dielectric in capacitors, as slot insulation for motors, primary insulation for heat-resistant wire, pressure-sensitive electrical tape, split mica insulating tape, i.e., mica sheet laminated between film, small condensers, metal foil laminated to film or film having an adherent metal coating, weather resistant electrical wire, i.e., a conductor wrapped with film coated with asphalt, as a wrapping for submerged pipe to insulate against ground currents, as primary and secondary insulation in transformer construction, as a dielectric in electroluminescent structures, etc. They may also be used to laminate or adhere glass and metal surfaces to themselves, to each other, or to a like surface. Two mating glass objects may be heat-sealed vacuum-tight by inserting an interlayer of the superpolyester either as a powder, as a film, or as a surface coating between two glass surfaces to be formed. Pressure or vacuum is applied to the assembly after it is heated to the softening point of the superpolyester to firmly adhere the two glass surfaces together. This process may be used for forming vacuum-tight seals between two mating glass surfaces such as for making a cathode ray tube and other devices as disclosed and claimed in Day et al. application Serial No. 33,129, filed concurrently herewith and assigned to the same assignee as the present invention.

Other valuable uses for the superpolyester of p-phenylene isophthalate will be readily apparent to those skilled in the art. Also, many apparently widely different embodiments such as the adding of pigments, fillers, stabilizers, plasticizers, etc., may be made to modify the properties of the polymers without departing from the spirit and scope of the invention. It is therefore to be understood that changes may be made in the particular embodiments of the invention described which are within the full intended scope of the invention as defined by the appended claims.

What we claim as new and desire to secure by Letters Patent of the United States is:

1. A linear, superpolyester of p-phenylene isophthalate units interspersed with p-phenylene terephthalate units, the intrinsic viscosity of said superpolyesters being at least 0.5 and the isophthalate content being at least 60 mole percent of the total of the isophthalate and terephthalate content of said superpolyester, said superpolyester having the repeating structural unit

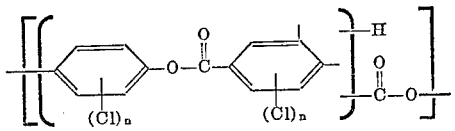

where $n$ is one of the integers 0, 1, 2.

2. The linear superpolyester of claim 1 wherein the isophthalate component is from 70 to 95 mole percent of the total of the isophthalate and terephthalate content of said superpolyester.

3. A fiber comprising a crystalline, linear superpolyester of p-phenylene isophthalate units interspersed with p-phenylene terephthalate units, the intrinsic viscosity of said superpolyester being at least 0.5 and the isophthalate content being at least 60 mole percent of the total of the isophthalate and terephthalate content of said superpolyester, said fiber having been cold drawn to structurally orient the polymer in the direction of the fiber axis, said superpolyester having the repeating structural unit

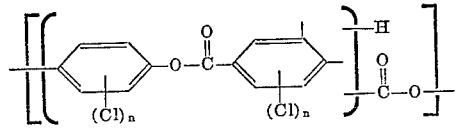

where $n$ is one of the integers 0, 1, 2.

4. A film comprising an amorphous, linear superpolyester of p-phenylene isophthalate units interspersed with p-phenylene terephthalate units, the intrinsic viscosity of said superpolyester being at least 0.5 and the isophthalate content being at least 60 mole percent of the total of the isophthalate and terephthalate content of the said superpolyester, said superpolyester having the repeating structural unit

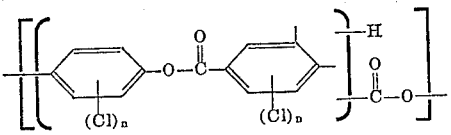

where $n$ is one of the integers 0, 1, 2.

5. A film comprising a crystalline, linear superpolyester of p-phenylene isophthalate units interspersed with p-phenylene terephthalate units, the intrinsic viscosity of said superpolyester being at least 0.5 and the isophthalate content being at least 60 mole percent of the total of the isophthalate and terephthalate content of said superpolyester, said superpolyester having the repeating structural unit

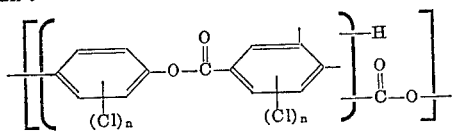

where $n$ is one of the integers 0, 1, 2.

6. A film comprising a crystalline, linear superpolyester of p-phenylene isophthalate units interspersed with p-phenylene terephthalate units, the intrinsic viscosity of said superpolyester being at least 0.5 and the isophthalate content being at least 60 mole percent of the total of the isophthalate and terephthalate content of said superpolyester, said film having been cold drawn in at least one of its two major dimensions to structurally orient the polymer in at least one direction in the plane of the film, said superpolyester having the repeating structural unit

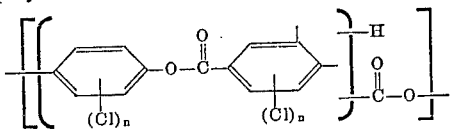

where $n$ is one of the integers 0, 1, 2.

7. A film comprising an essentially transparent, crystalline, linear superpolyester of p-phenylene isophthalate units interspersed with p-phenylene terephthalate units, the intrinsic viscosity of said superpolyester being at least 0.5 and the isophthalate content being at least 60 mole percent of the total of the isophthalate and terephthalate content of said superpolyester, said superpolyester having the repeating structural unit

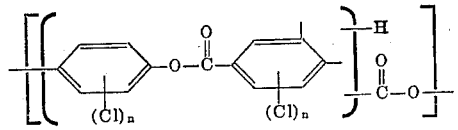

where $n$ is one of the integers 0, 1, 2.

8. The process of preparing an essentially transparent, crystalline, linear superpolyester of p-phenylene isophthalate units interspersed with p-phenylene terephthalate units, the intrinsic viscosity of said superpolyester being at least 0.5 and the isophthalate content being at least 60 mole percent of the total of the isophthalate and terephthalate content of said superpolyester, which comprises heating a quenched amorphous form of said superpolyester at a temperature in the range of 200° to 350° C. until equilibrium of the crystalline state is essentially established, said superpolyester having the repeating structural unit

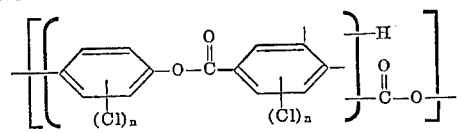

where $n$ is one of the integers 0, 1, 2.

9. An insulated electrical conductor comprising an electrical conductor having on its surface a linear superpolyester of p-phenylene isophthalate units interspersed with p-phenylene terephthalate units, the instrinsic viscosity of said superpolyester being at least 0.5 and the isophthalate content being at least 60 mole percent of the total of the isophthalate and terephthalate content of said superpolyester, said superpolyester having the repeating structural unit

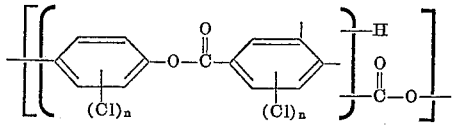

where $n$ is one of the integers 0, 1, 2.

10. The process of preparing an insulated electrical conductor which comprises covering an electrical conductor with an amorphous, linear superpolyester of p-phenylene isophthalate units interspersed with p-phenylene terephthalate units, the intrinsic viscosity of said superpolyester being at least 0.5 and the isophthalate content being at least 60 mole percent of the total of the isophthalate and terephthalate content of said superpolyester, and thereafter causing said amorphous superpolyester to shrink onto the electrical conductor by heating said superpolyester to a temperature in the range of 200° to 350° C., said superpolyester having the repeating structural unit

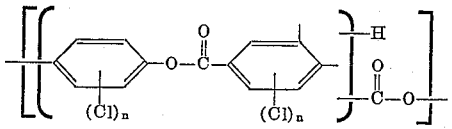

where $n$ is one of the integers 0, 1, 2.

References Cited in the file of this patent

UNITED STATES PATENTS

| | | |
|---|---|---|
| 2,595,343 | Drewitt et al. | May 6, 1952 |
| 2,954,355 | Young et al. | Sept. 27, 1960 |

FOREIGN PATENTS

| | | |
|---|---|---|
| 553,841 | Belgium | June 29, 1957 |